US007161768B1

(12) United States Patent
Oveyssi (10) Patent No.: US 7,161,768 B1
(45) Date of Patent: Jan. 9, 2007

(54) DISK DRIVE INCLUDING AN ORTHOGONALLY DISPOSED ACTUATOR COIL AND AN E-SHAPED VOICE COIL MOTOR YOKE FOR SUPPORTING A PAIR OF VOICE COIL MAGNETS

(75) Inventor: Kamran Oveyssi, San Jose, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 484 days.

(21) Appl. No.: 10/724,410

(22) Filed: Nov. 26, 2003

(51) Int. Cl.
*G11B 21/02* (2006.01)

(52) U.S. Cl. .................................. 360/264.8; 360/265

(58) Field of Classification Search ............ 360/264.8, 360/264.7, 265, 265.8
See application file for complete search history.

(56) References Cited

U.S. PATENT DOCUMENTS

| 4,652,779 | A | * | 3/1987 | Wilcox ...................... 310/13 |
| 4,658,313 | A | * | 4/1987 | Takahashi et al. ....... 360/78.12 |
| 5,041,934 | A | * | 8/1991 | Stefansky ................ 360/264.7 |
| 5,666,244 | A | * | 9/1997 | Ogawa .................... 360/256.2 |
| 5,731,642 | A | * | 3/1998 | Ogawa ....................... 310/13 |
| 5,764,440 | A | * | 6/1998 | Forbord ...................... 360/265 |
| 5,768,061 | A | * | 6/1998 | Casey et al. ............... 360/265 |
| 5,847,903 | A | * | 12/1998 | Ogawa et al. ........... 360/264.8 |
| 6,421,208 | B1 | * | 7/2002 | Oveyssi .................. 360/264.8 |
| 6,462,914 | B1 | * | 10/2002 | Oveyssi et al. ......... 360/264.8 |
| 6,529,351 | B1 | * | 3/2003 | Oveyssi et al. ......... 360/264.8 |
| 6,775,105 | B1 | * | 8/2004 | Hong et al. ............. 360/264.7 |
| 2004/0057160 | A1 | * | 3/2004 | Hong et al. ............. 360/264.7 |

FOREIGN PATENT DOCUMENTS

| JP | 56101370 A | * | 8/1981 |
| JP | 01089946 A | * | 4/1989 |
| JP | 03080475 A | * | 4/1991 |
| JP | 03122875 A | * | 5/1991 |
| JP | 2000268515 A | * | 9/2000 |

OTHER PUBLICATIONS

"HIgh Performance Rotary Actuator," Feb. 1, 1990, IBM TDB, vol. 32, Iss. No. 9B, pp. 42-43.*

* cited by examiner

*Primary Examiner*—William J. Klimowicz
(74) *Attorney, Agent, or Firm*—Stetina Brunda Garred & Brucker

(57) ABSTRACT

A disk drive including a generally E-shaped voice coil motor yoke. The yoke includes a generally C-shaped integrally formed first yoke body, the first yoke body including a first yoke first prong and a first yoke second prong. The yoke further includes a generally C-shaped integrally formed second yoke body. The second yoke body including a second yoke first prong and a second yoke second prong with the second yoke second prong coupled to the first yoke second prong. The disk drive further includes a first voice coil magnet supported by the first yoke first prong and a second voice coil magnet supported by the second yoke first prong. The disk drive further includes an actuator having an actuator coil that is positionable about the first yoke second prong and the second yoke second prong and between the first voice coil magnet and the second voice coil magnet.

18 Claims, 5 Drawing Sheets

DISK DRIVE INCLUDING AN ORTHOGONALLY DISPOSED ACTUATOR COIL AND AN E-SHAPED VOICE COIL MOTOR YOKE FOR SUPPORTING A PAIR OF VOICE COIL MAGNETS

BACKGROUND OF THE INVENTION

1. Field of the Invention

The present invention relates generally to disk drives, and in particular to a disk drive including an orthogonally disposed voice coil and an E-shaped voice coil motor yoke for supporting a pair of voice coil magnets.

2. Description of the Prior Art

The typical hard disk drive includes a head disk assembly (HDA) and a printed circuit board assembly (PCBA) attached to a disk drive base of the HDA. The head disk assembly includes at least one magnetic disk, a spindle motor for rotating the disk, and a head stack assembly (HSA). The spindle motor includes a spindle motor hub that is rotatably attached to the disk drive base. The hub has an outer hub flange that supports a lowermost one of the disks. Additional disks may be stacked and separated with annular disk spacers that are disposed about the hub. The head stack assembly has an actuator assembly having at least one transducer head, typically several, for reading and writing data from and to the disk. The printed circuit board assembly includes a servo control system in the form of a disk controller for generating servo control signals. The head stack assembly is controllably positioned in response to the generated servo control signals from the disk controller. In so doing, the attached heads are moved relative to tracks disposed upon the disk.

The head stack assembly includes an actuator assembly, at least one head gimbal assembly, and a flex circuit cable assembly. A conventional "rotary" or "swing-type" actuator assembly typically includes an actuator having an actuator body. The actuator body is configured to rotate on a pivot assembly between limited positions about an axis of rotation. A coil support extends from one side of the actuator body. A coil is supported by the coil support and is configured to interact with one or more permanent magnets to form a voice coil motor. One or more actuator arms extend from an opposite side of the actuator body.

A head gimbal assembly includes a transducer head, typically a magneto-resistive ("MR") head, which is distally attached to each of the actuator arms. To facilitate rotational movement of the actuator, the actuator assembly further includes the actuator body that has a bore and a pivot bearing cartridge engaged within the bore. Each magnetic disk includes opposing disk surfaces. Data may be recorded on a single surface or both along data annular regions. As such, the head stack assembly may be pivoted such that each transducer head is disposed adjacent the various data annular regions from adjacent the outer diameter to the inner diameter of each disk.

It is contemplated that due to the critical nature of the controlled movement of the actuator as facilitated by the voice coil motor, there is an constant need to improve the voice coil motor configuration in comparison to the prior art.

SUMMARY OF THE INVENTION

According to an aspect of the present invention, there is provided a disk drive including a disk drive base. The disk drive further includes a generally E-shaped voice coil motor yoke coupled to the disk drive base. The voice coil motor yoke includes a generally C-shaped integrally formed first yoke body. The first yoke body includes a first yoke first prong and a first yoke second prong. The voice coil motor yoke further includes a generally C-shaped integrally formed second yoke body. The second yoke body including a second yoke first prong and a second yoke second prong. The second yoke second prong is coupled to the first yoke second prong. The disk drive further includes a first voice coil magnet supported by the first yoke first prong disposed toward the first yoke second prong. The disk drive further includes a second voice coil magnet supported by the second yoke first prong disposed toward the second yoke second prong. The second voice coil magnet has a same polarity disposed towards the second yoke second prong as the first voice coil magnet has disposed towards the first yoke second prong. The disk drive further includes an actuator configured to rotate about an axis of rotation. The actuator includes an actuator body rotatably coupled to the disk drive base and an actuator coil coupled to the actuator body, the actuator coil defining a coil axis disposed orthogonal to the axis of rotation, the actuator coil being positionable about the first yoke second prong and the second yoke second prong and between the first voice coil magnet and the second voice coil magnet.

According to various embodiments, an adhesive may be used to couple the second yoke second prong to the first yoke second prong. The first and second yoke bodies are formed of a magnetic conductive material. The first and second yoke bodies may be formed of steel. The first and second yoke bodies may be nickel plated. The second yoke second prong may be welded to the first yoke second prong. The first yoke first prong may include a first tab, and the first tab may include a fastener hole formed though the first tab, the first yoke body is coupled to the disk drive base with a fastener disposed through the first tab. The first yoke first prong may include a first yoke distal end, and the first tab is disposed adjacent the first yoke distal end. The second yoke first prong may include a second tab, and the second tab may include a fastener hole formed through the second tab. The second yoke body is coupled to the disk drive base with a fastener disposed through the second tab. The second yoke second prong may include a second yoke distal end, and the second tab may be disposed adjacent the second yoke distal end. The first yoke second prong and the second yoke second prong may be generally arc-shaped.

According to another aspect of the present invention, there is provided a disk drive. The disk drive includes a disk drive base. The disk drive further includes a generally E-shaped voice coil motor yoke coupled to the disk drive base. The voice coil motor yoke includes a first prong having opposing engagement and distal ends. The first prong includes a projection extending from the engagement end. The yoke further includes a generally C-shaped yoke body. The yoke body includes second and third prongs and a transition section disposed between the second and third prongs. The transition section including an engagement opening formed in the transition section and configured to engage the projection of the first prong. The disk drive further includes a first voice coil magnet supported by the second prong disposed toward the first prong. The disk drive further includes a second voice coil magnet supported by the third prong disposed toward the first prong. The second voice coil magnet having a same polarity disposed towards first prong as the first voice coil magnet having disposed towards the first prong. The disk drive further includes an actuator configured to rotate about an axis of rotation. The actuator includes an actuator body rotatably coupled to the disk drive base and an actuator coil coupled to the actuator body. The actuator coil defining a coil axis disposed orthogonal to the axis of rotation, the actuator coil is positionable about the first prong and between the first and second voice coil magnets.

According to various embodiments, the transition section may define a transition section thickness, and the projection may define a projection length as least as long as the transition section thickness. The engagement opening may be laterally centered in the transition section. The engagement opening may extend through the transition section. The engagement opening may include a pair of openings laterally disposed about the transition section, and the projection may includes a pair of projections extending from the engagement end. The projections are engaged within the engagement openings with the transition section disposed between the projections. The engagement opening may include multiple openings, and the projection may include multiple projections extending from the engagement end, each of the projections are respectively engaged within the engagement openings. An adhesive may be used to engage the first prong within the engagement opening. The first prong may have has a thickness about twice that of the second and third prongs.

BRIEF DESCRIPTION OF THE DRAWINGS

FIG. 7 is a enlarged plan view of a voice coil motor yoke according to another embodiment with a first prong exploded there from;

FIG. 10 is a enlarged plan view of a voice coil motor yoke according to another embodiment with a first prong exploded there from; and FIG. 11 is a enlarged plan view of a voice coil motor yoke according to another embodiment with a first prong exploded there from.

DESCRIPTION OF THE PREFERRED EMBODIMENTS

Referring now to the drawings wherein the showings are for purposes of illustrating preferred embodiments of the present invention only, and not for purposes of limiting the same, FIGS. 1–11 illustrate a disk drive in accordance with aspects of the present invention.

Figure 1:
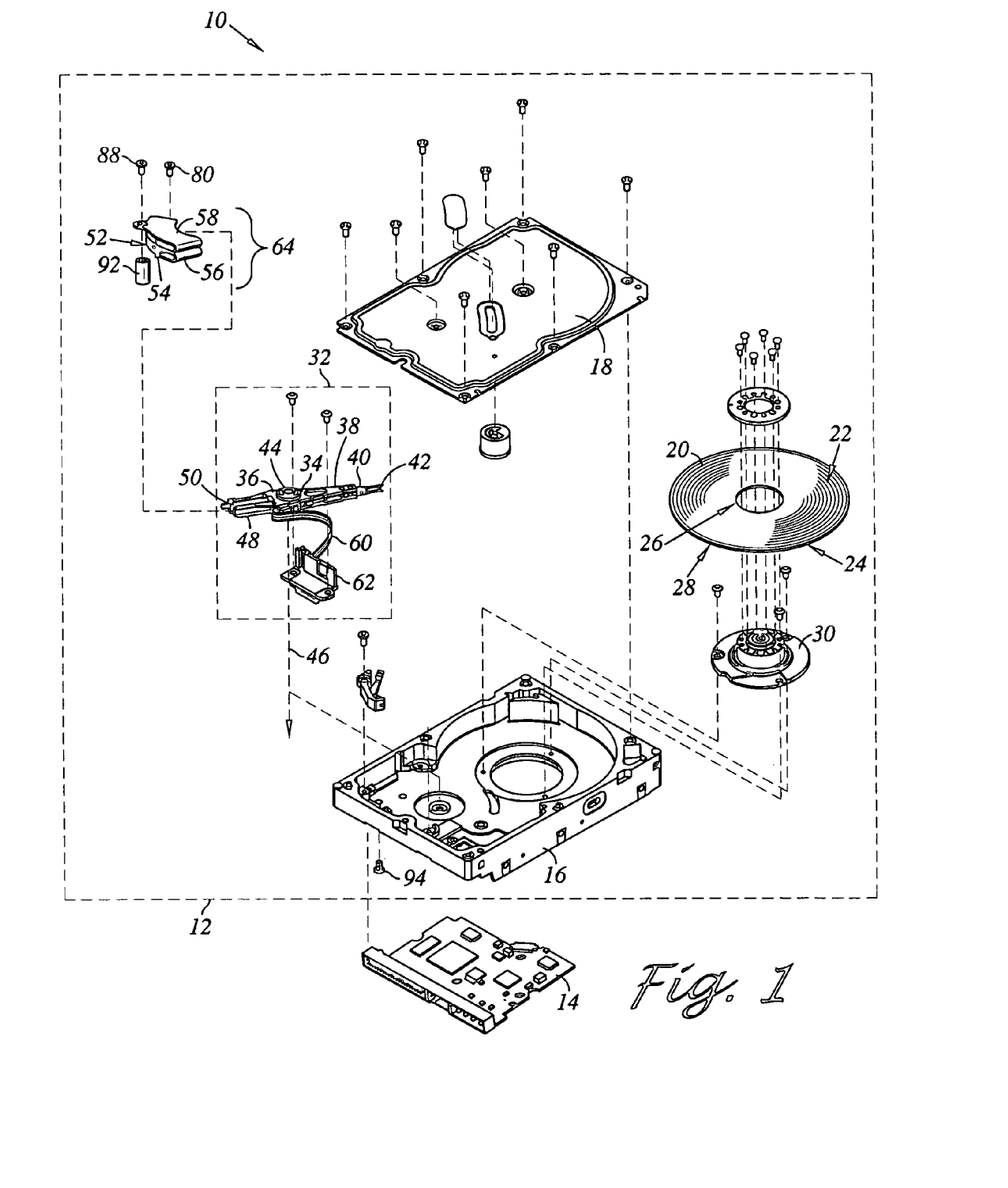
FIG. 1 is an exploded perspective view of a disk drive in accordance with an aspect of the present invention.

Referring now to FIG. 1, there is depicted an exploded perspective view of a disk drive 10 as constructed in accordance with an aspect of the present invention. The disk drive 10 includes a head disk assembly (HDA) 12 and a printed circuit board assembly (PCBA) 14. The head disk assembly 12 includes a disk drive housing having disk drive housing members, such as a disk drive base 16 and a cover 18. The disk drive base 16 and the cover 18 collectively house at least one magnetic disk 20. While a single disk 20 is shown, multiple disks may be provided. The disk 20 contains a plurality of tracks for storing data. The tracks are disposed upon opposing first and second disk surfaces 22, 24 of the disk 20 that extend between an inner disk edge 26 (associated with the inner diameter) and an outer disk edge 28 (associated with the outer diameter) of the disk 20. The head disk assembly 12 further includes a spindle motor 30 for rotating the disk 20. The head disk assembly 12 further includes a head stack assembly 32 rotatably attached to the disk drive base 16 in operable communication with the disks 20. The head stack assembly 32 includes a rotary actuator 34.

The actuator 34 includes an actuator body 36 and actuator arms (for ease of illustration, only a lowermost one being denoted 38) that extend from the actuator body 36. Distally attached to the actuator arms (the lowermost one being denoted 38) are head gimbal assemblies (the lowermost one denoted 40). The head gimbal assemblies 40 each includes a slider (the lowermost one denoted 42). Each of the sliders 42 includes a transducer head. The head gimbal assemblies 40 with the sliders 42 not attached are referred to as suspension assemblies. It is contemplated that the number of actuator arms and suspension assemblies may vary depending upon the number of disks and disk surfaces utilized.

The actuator body 36 includes a bore, and the actuator 34 further includes a pivot bearing cartridge 44 engaged within the bore for facilitating the actuator body 36 to rotate between limited positions about an axis of rotation 46. The actuator 34 further includes a coil support 48 that extends from one side of the actuator body 36 opposite the actuator arms 38. The coil support 48 is configured to support a coil 50.

As discussed in detail below, first and second voice coil magnets 52, 54 are supported by first and second yoke bodies 56, 58 which are coupled to the disk drive base 16. The coil 50 interacts with the magnets 52, 54 to form a voice coil motor for controllably rotating the actuator 34.

The head stack assembly 32 further includes a flex circuit assembly 60 and a cable connector 62. The cable connector 62 is attached to the disk drive base 16 and is disposed in electrical communication with the printed circuit board 14. The flex circuit 60 supplies current to the actuator coil 50 and carries signals between the transducer heads 42 and the printed circuit board assembly 14.

Figure 2:
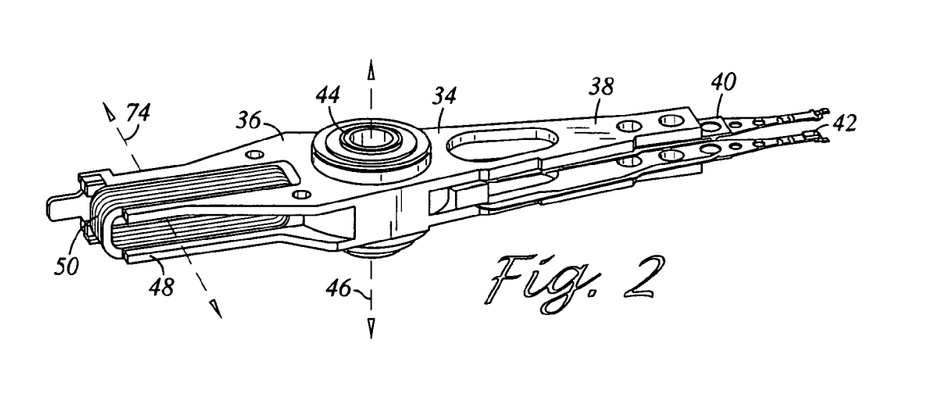
FIG. 2 is an enlarged perspective view of an actuator of FIG. 1.
Figure 3:
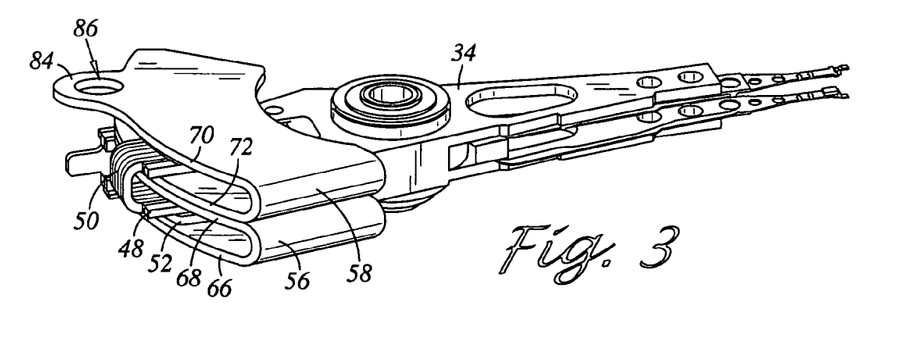
FIG. 3 is the actuator of FIG. 2 shown in relation to a voice coil motor yoke also of FIG. 1.
Figure 4:
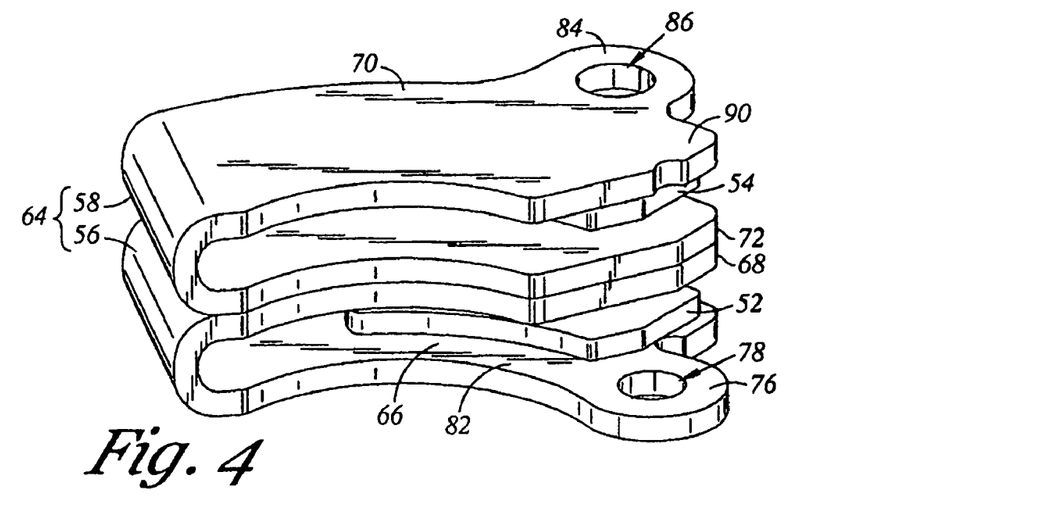
FIG. 4 is an enlarged perspective view of the voice coil motor yoke of FIG. 3 as seen from another viewing angle.
Figure 5:
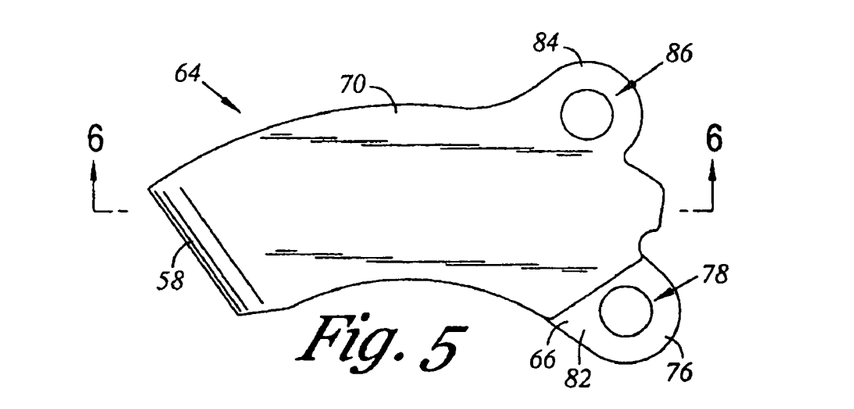
FIG. 5 is top plan view of the voice coil motor yoke of FIG. 4.

According to an aspect of the present invention, there is provided a disk drive 10. The disk drive includes the disk drive base 16. The disk drive further includes a generally E-shaped voice coil motor yoke 64 coupled to the disk drive base 16. The voice coil motor yoke 64 includes the generally C-shaped integrally formed first yoke body 56. The first yoke body 56 includes a first yoke first prong 66 and a first yoke second prong 68. The first yoke body 56 further includes the generally C-shaped integrally formed second yoke body 58. The second yoke 58 includes a second yoke first prong 70 and a second yoke second prong 72. The second yoke second prong 72 is coupled to the first yoke second prong 68. The disk drive 10 further includes the first voice coil magnet 52 supported by the first yoke first prong 66 disposed toward the first yoke second prong 68. The disk drive 10 further includes the second voice coil magnet 54 supported by the second yoke first prong 70 disposed toward the second yoke second prong 72. The second voice coil magnet 54 has a same polarity disposed towards the second yoke second prong 72 as the first voice coil magnet 52 has disposed towards the first yoke second prong 68. The disk drive 10 further includes the actuator 34 configured to rotate about an axis of rotation 46. The actuator 34 includes the actuator body 36 rotatably coupled to the disk drive base 16 and the actuator coil 50 coupled to the actuator body 36. As shown in FIG. 2, the actuator coil 50 defines a coil axis 74 disposed orthogonal to the axis of rotation 46. As shown in FIG. 3, the actuator coil 50 is positionable about the first yoke second prong 68 and the second yoke second prong 72 and between the first voice coil magnet 52 and the second voice coil magnet 54.

Figure 6:
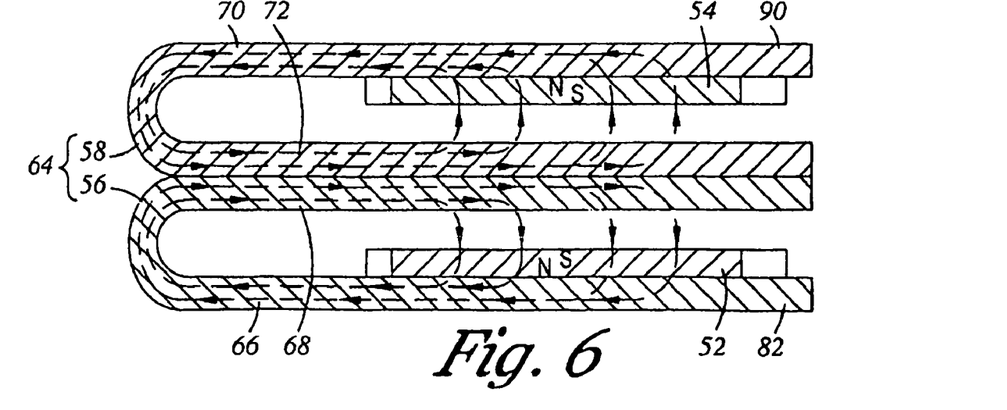
FIG. 6 is a cross sectional view of the voice coil motor yoke of FIG. 5 as seen along axis 6—6 with magnetic flux lines indicated.

In the embodiment shown, the actuator coil 50 is what may be referred to as a vertical coil. Upon rotation of the actuator body 36, the actuator coil 50 is configured to pass over and about the first yoke second prong 68 and the second yoke second prong 72. Further, upon such rotation, the actuator coil 50 is configured to in the magnetic fields of the first and second voice coil magnets 52, 54. In this regard, the present invention allows magnetic interaction of both legs of the actuator coil 50 to contribute towards the production a resultant magnetic field induced force upon the actuator body 36 for rotating the same. Shown in FIG. 6 is a cross sectional view of the voice coil motor yoke 64 and attached first and second voice coil magnets 52, 54. Magnetic flux lines are symbolically indicated which correspond to the indicated polarities of the first and second voice coil magnets 52, 54. In FIG. 6 current flowing through the actuator coil 50 into the page adjacent the first voice coil magnet 52 and out of the page adjacent the second voice coil magnet 54, this would correlate to the actuator 34 rotation in a clockwise direction as seen in FIG. 3.

In order to facilitate the passing of the actuator coil 50 about the first yoke second prong 68 and the second yoke second prong 72 during rotation of the actuator body 36, the first yoke second prong 68 and the second yoke second prong 72 may be generally arc-shaped.

It is contemplated that the generally C-shaped first and second yoke bodies 56, 58 can be relatively simple to produce. As each of the first and second yoke bodies 56, 58 are integrally formed, such shaping may be accomplished through a bending process for example. As used herein, the term C-shaped refers to any single structure that terminates in two prongs or legs the majority of which extend in a same general direction. Transition between such prongs or legs may be curved, such as shown, or more of a acute right angle. As used herein, the term E-shaped referred to the resulting shape of two C-shaped objects being coupled together, with their respective prongs extending in a common direction.

The first and second yoke bodies 56, 58 are formed of a magnetic conductive material which may be chosen from those which are well known to one of ordinary skill in the art. For example, the first and second yoke bodies 56, 58 may be formed of magnetic steel. In such an arrangement, an adhesive may be used to couple the second yoke second prong 72 to the first yoke second prong 68. Such adhesive may be UV or heat cured adhesives and may be chosen from those which are well known to one of ordinary skill in the art. Further, the first and second yoke bodies 56, 58 are nickel plated. Such plating may be used to protect the first and second yoke bodies 56, 58 from oxidation. In another coupling arrangement, the first and second yoke bodies 56, 58 may be coupled to each other, with the second yoke second prong 72 being welded to the first yoke second prong 68. This may be accomplished through simple spot welding for example.

As mentioned above, the E-shaped voice coil motor yoke 64 is coupled to the disk drive base 16. This may be accomplished by any of those methods which are well known to one of ordinary skill in the art. In addition, in the embodiment shown, the first yoke first prong 66 includes a first tab 76. The first tab 76 includes a fastener hole 78 formed through the first tab 76. The first yoke body 56 is coupled to the disk drive base 16 with a fastener 80 disposed through the first tab 76. The first yoke first prong 66 includes a first yoke distal end 82. The first tab 76 is disposed adjacent the first yoke distal end 82. It is contemplated that the first tab 76 may be disposed at other locations about the first yoke first prong 66 as well.

Further, the second yoke first prong 70 includes a second tab 84. The second tab 84 includes a fastener hole 86 formed through the second tab 84. The second yoke body 58 is coupled to the disk drive base 16 with a fastener 88 disposed through the second tab 84. The second yoke first prong 70 includes a second yoke distal end 90. The second tab 84 is disposed adjacent the second yoke distal end 90. Further, a post 92 may be provided to support the second yoke first prong 70 at the second tab 84. The fastener 88 may be engaged with the post 92. The post 92 may be further engaged with the disk drive base 16 with another fastener 94. While the second tab 84 may be disposed at other locations about the second yoke first prong 70, it is contemplated that such distal support of the second yoke first prong 70 may facilitate a mitigation of undesirable vibration of the second yoke first prong 70. Although not shown, it is further contemplated that the disk drive base 16 may include a raised molded feature so as to replace usage of the post 92.

Figure 7:
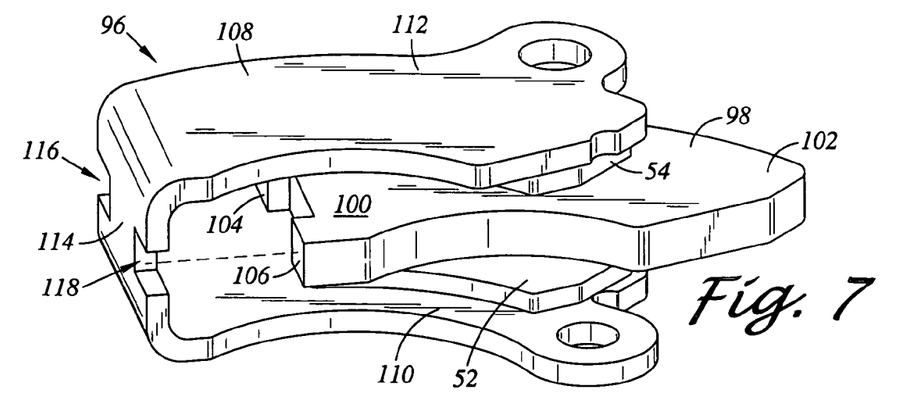
Figure 8:
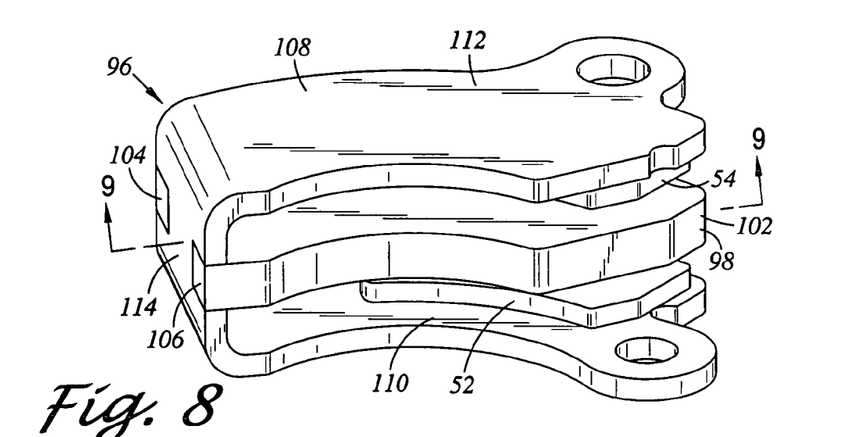
FIG. 8 is the voice coil motor yoke of FIG. 7 as assembled.
Figure 9:
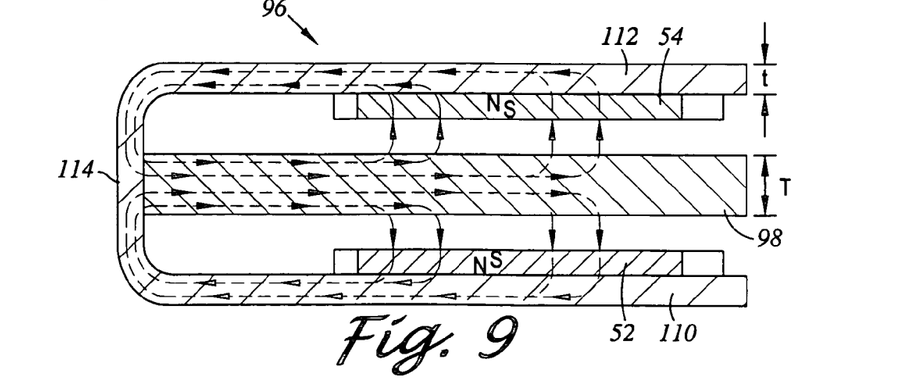
FIG. 9 is a cross sectional view of the voice coil motor yoke of FIG. 8 as seen along axis 9—9 with magnetic flux lines indicated.

Referring now to FIGS. 7–9, according to another aspect of the present invention, there is provided a disk drive 10 including the disk drive base 16. The disk drive 10 further includes a generally E-shaped voice coil motor yoke 96 coupled to the disk drive base 16. The voice coil motor yoke 96 includes a first prong 98 having opposing engagement and distal ends 100, 102. The first prong 98 includes a pair of projections 104, 106 that extend from the engagement end 100. The yoke 96 further includes a generally C-shaped yoke body 108. The yoke body 108 includes second and third prongs 110, 112 and a transition section 114 disposed between the second and third prongs 110, 112. The transition section 114 includes first and second engagement openings 116, 118 formed in the transition section 114 and is configured to engage the projections 104, 106 of the first prong 98. The disk drive 10 further includes the first voice coil magnet 52 supported by the second prong 110 disposed toward the first prong 98. The disk drive 10 further includes the second voice coil magnet 54 supported by the third prong 112 disposed toward the first prong 98. The first voice coil magnet 52 has a same polarity disposed towards the first prong 98 as the second voice coil magnet 54 has disposed towards the first prong 98. The disk drive 10 further includes the actuator 34 configured to rotate about the axis of rotation 46. The actuator 34 includes the actuator body 36 rotatably coupled to the disk drive base 16 and the actuator coil 50 coupled to the actuator body 36. The actuator coil 50 defines the coil axis 74 disposed orthogonal to the axis of rotation 74. The actuator coil 50 is positionable about the first prong 98 and between the first and second voice coil magnets 52, 54.

In the embodiment shown, upon rotation of the actuator body 36, the actuator coil 50 is configured to pass over and about the first prong 98. Further upon such rotation, the actuator coil 50 is configured to pass in the magnetic fields of the first and second voice coil magnets 52, 54. In this regard, the present invention allows magnetic interaction of both legs of the actuator coil 50 to contribute towards the production of a resultant magnetic field induced force upon the actuator body 36 for rotating the same. Shown in FIG. 9 is a cross sectional view of the voice coil motor yoke 96 and attached first and second voice coil magnets 52, 54. Magnetic flux lines are symbolically indicated which correspond to the indicated polarities of the first and second voice coil magnets 52, 54.

The first prong 98 may have a thickness T different than a thickness t of the second and third prongs 110, 112. In order to facilitate an efficient magnetic flux flow through the voice coil motor yoke 96, the first prong 98 has a thickness about twice that of the second and third prongs 110, 112.

The first prong 98 and the yoke body 108 may be formed of a magnetic conductive material which may be chosen from those which are well known to one of ordinary skill in the art. For example, the first prong 98 and the yoke body 108 may be formed of magnetic steel.

The first and second engagement openings 116, 118 are laterally disposed about the transition section 114. The projections 104, 106 are engaged within the engagement openings 116, 118 with the transition section 114 disposed between the projections 104, 106. As shown the projections 104, 106 extend through the transition section 114 in first and second engagement openings 116, 118. The transition section 114 defines a transition section thickness and the projections 104, 106 define a projection length at least as long as the transition section thickness. As shown, the projection length is equal to the transition section thickness. The projections 104, 106 may be engaged with the first and second engagement openings 116, 118 with an adhesive.

As mentioned above, the E-shaped voice coil motor yoke 96 is coupled to the disk drive base 16. This may be accomplished by any of those methods which are well known to one of ordinary skill in the art. For example, tabs may be utilized which are similar to the first and second tabs 76, 84 discussed above.

Figure 10:
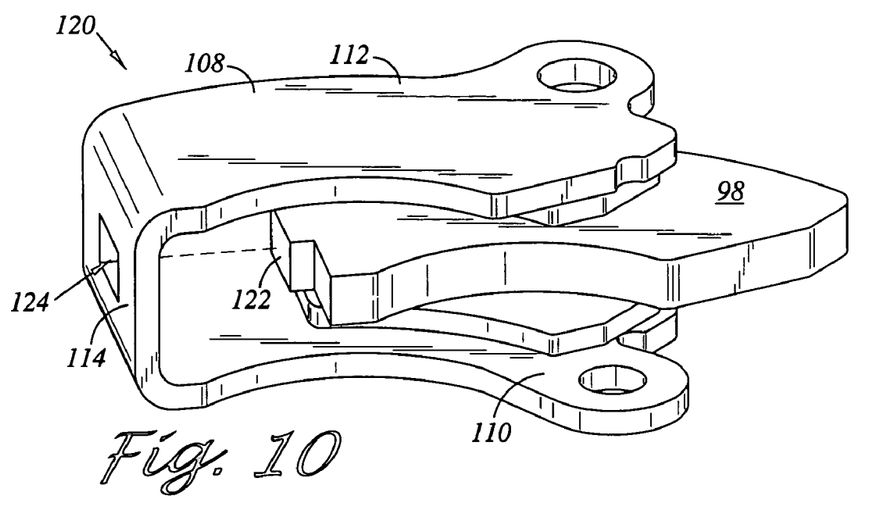

According to another embodiment, referring now to FIG. 10, there is provided an E-shaped voice coil motor yoke 120. The voice coil motor yoke 120 is similar to the voice coil motor yoke 96, however, with the differences noted. In this embodiment, the first prong 98 includes a single projection 122. The transition section 114 includes an engagement opening 124 which is laterally centered in the transition section 114 and configured to engage the projection 122.

Figure 11:
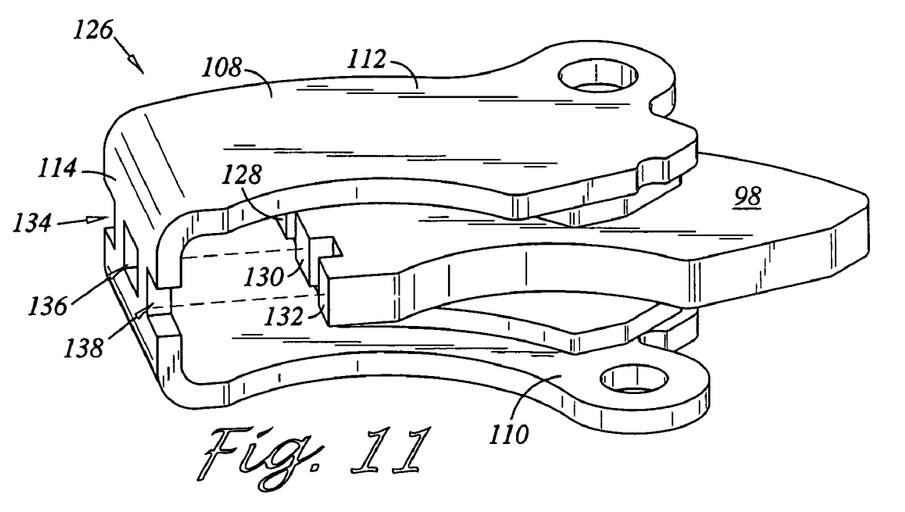

According to another embodiment, referring now to FIG. 11, there is provided an E-shaped voice coil motor yoke 126. The voice coil motor yoke 126 is similar to the voice coil motor yoke 96, however, with the differences noted. In this embodiment, the first prong 98 includes multiple projections, specifically in this embodiment, there is provided three projections 128, 130, 132. The transition section 114 includes corresponding engagement openings 134, 136, 138 which are configured to engage the projections 128, 130, 132.

I claim:

1. A disk drive comprising:
a disk drive base;
a generally E-shaped voice coil motor yoke coupled to the disk drive base, the voice coil motor yoke including:
a generally C-shaped integrally formed second yoke body, the second yoke body including a second yoke second yoke first prong and second yoke second prong, the second yoke second prong being coupled to the first yoke second prong;
a first voice coil magnet supported by the first yoke first prong disposed toward the first yoke second prong;
a second voice coil magnet supported by the second yoke first prong disposed toward the second yoke second prong, the second voice coil magnet having a same polarity disposed towards the second yoke second prong as the first voice coil magnet having disposed towards the first yoke second prong; and
an actuator configured to rotate about an axis of rotation, the actuator including the actuator body rotatably coupled to the disk drive base and an actuator coil coupled to the actuator body, the actuator coil defining a coil axis disposed orthogonal to the axis of rotation, the actuator coil being positionable about the first yoke second prong and the second yoke second prong and between the first voice coil magnet and the second voice coil magnet.

2. The disk drive of claim 1 wherein an adhesive is used to couple the second yoke second prong to the first yoke second prong.

3. The disk drive of claim 1 wherein the first and second yoke bodies are formed of a magnetic conductive material.

4. The disk drive of claim 3 wherein the first and second yoke bodies are formed of steel.

5. The disk drive of claim 4 wherein the first and second yoke bodies are nickel plated.

6. The disk drive of claim 4 wherein the second yoke second prong is welded to the first yoke second prong.

7. The disk drive of claim 1 wherein the first yoke first prong includes a first tab, the first tab includes a fastener hole formed through the first tab, the first yoke body is coupled to the disk drive base with a fastener disposed through the first tab.

8. The disk drive of claim 7 wherein the first yoke first prong includes a first yoke distal end, the first tab is disposed adjacent the first yoke distal end.

9. The disk drive of claim 7 wherein the second yoke first prong includes a second tab, the second tab includes a fastener hole formed through the second tab, the second yoke body is coupled to the disk drive base with a fastener disposed through the second tab.

10. The disk drive of claim 9 wherein the first yoke first prong includes a first yoke distal end, the first tab is disposed adjacent the first yoke distal end, the second yoke second prong includes a second yoke distal end, the second tab is disposed adjacent the second yoke distal end.

11. The disk drive of claim 1 wherein the first yoke second prong and the second yoke second prong are generally arc-shaped.

12. A disk drive comprising:
a disk drive base;
a generally E-shaped voice coil motor yoke coupled to the disk drive base, the voice coil motor yoke including a first prong having opposing engagement and distal ends, the first prong including a projection extending from the engagement end, the yoke further includes a generally C-shaped yoke body, the yoke body including second and third prongs and a transition section disposed between the second and third prongs, the transition section including an engagement opening formed in the transition section and configured to engage the projection of the first prong, the transition section defining a transition section thickness, the projection defining a projection length as least as long as the transition section thickness;

a first voice coil magnet supported by the second prong;
a second voice coil magnet supported by the third prong, the second voice coil magnet having a same polarity disposed towards the first prong as the first voice coil magnet having disposed towards the first prong; and
an actuator configured to rotate about an axis of rotation, the actuator including an actuator body rotatably coupled to the disk drive base and an actuator coil coupled to the actuator body, the actuator coil defining a coil axis of rotation, the actuator coil being positionable about the first prong and between the first and second voice coil magnets.

13. The disk drive of claim 12 wherein the engagement opening is laterally centered in the transition section.

14. The disk drive of claim 12 wherein an adhesive is used to engage the first prong within the engagement opening.

15. A disk drive comprising:
a disk drive base;
a generally E-shaped voice coil motor yoke coupled to the disk drive base, the voice coil motor yoke including a first prong having opposing engagement and distal ends, the first prong including a projection extending from the engagement end, the yoke further includes a generally C-shaped yoke body, the yoke body including second and third prongs and a transition section disposed between the second and third prongs, the transition section including an engagement opening formed in the transition section and configured to engage the projection of the first prong, the engagement opening extending through the transition section;
a first voice coil magnet supported by the second prong;
a second voice coil magnet supported by the third prong, the second voice coil magnet having a same polarity disposed towards the first prong as the first voice coil magnet having disposed towards the first prong; and
an actuator configured to rotate about an axis of rotation, the actuator including an actuator body rotatably coupled to the disk drive base and an actuator coil coupled to the actuator body, the actuator coil defining a coil axis of rotation, the actuator coil being positionable about the first prong and between the first and second voice coil magnets.

16. A disk drive comprising:
a disk drive base;
a generally E-shaped voice coil motor yoke coupled to the disk drive base, the voice coil motor yoke including a first prong having opposing engagement and distal ends, the first prong including a projection extending from the engagement end, the yoke further includes a generally C-shaped yoke body, the yoke body including second and third prongs and a transition section disposed between the second and third prongs, the transition section including an engagement opening formed in the transition section and configured to engage the projection of the first prong, the engagement opening comprising a pair of openings laterally disposed about the transition section, the projection comprising a pair of projections extending from the engagement end, the projections being engaged within the engagement openings with the transition section disposed between the projections;
a first voice coil magnet supported by the second prong;
a second voice coil magnet supported by the third prong, the second voice coil magnet having a same polarity disposed towards the first prong as the first voice coil magnet having disposed towards the first prong; and
an actuator configured to rotate about an axis of rotation, the actuator including an actuator body rotatably coupled to the disk drive base and an actuator coil coupled to the actuator body, the actuator coil defining a coil axis of rotation, the actuator coil being positionable about the first prong and between the first and second voice coil magnets.

17. A disk drive comprising:
a disk drive base;
a generally E-shaped voice coil motor yoke coupled to the disk drive base, the voice coil motor yoke including a first prong having opposing engagement and distal ends, the first prong including a projection extending from the engagement end, the yoke further includes a generally C-shaped yoke body, the yoke body including second and third prongs and a transition section disposed between the second and third prongs, the transition section including an engagement opening formed in the transition section and configured to engage the projection of the first prong, the engagement openings comprising multiple openings, the projection comprising multiple projections extending from the engagement end, each of the projections being respectively engaged within the engagement openings;
a first voice coil magnet supported by the second prong;
a second voice coil magnet supported by the third prong, the second voice coil magnet having a same polarity disposed towards the first prong as the first voice coil magnet having disposed towards the first prong; and
an actuator configured to rotate about an axis of rotation, the actuator including an actuator body rotatably coupled to the disk drive base and an actuator coil coupled to the actuator body, the actuator coil defining a coil axis of rotation, the actuator coil being positionable about the first prong and between the first and second voice coil magnets.

18. A disk drive comprising:
a disk drive base;
a generally E-shaped voice coil motor yoke coupled to the disk drive base, the voice coil motor yoke including a first prong having opposing engagement and distal ends, the first prong including a projection extending from the engagement end, the yoke further includes a generally C-shaped yoke body, the yoke body including second and third prongs and a transition section disposed between the second and third prongs, the first prong having a thickness about twice that of the second and third prongs, the transition section including an engagement opening formed in the transition section and configured to engage the projection of the first prong;
a first voice coil magnet supported by the second prong;
a second voice coil magnet supported by the third prong, the second voice coil magnet having a same polarity disposed towards the first prong as the first voice coil magnet having disposed towards the first prong; and
an actuator configured to rotate about an axis of rotation, the actuator including an actuator body rotatably coupled to the disk drive base and an actuator coil coupled to the actuator body, the actuator coil defining a coil axis of rotation, the actuator coil being positionable about the first prong and between the first and second voice coil magnets.

* * * * *